United States Patent [19]
Mims

[11] 3,791,569
[45] Feb. 12, 1974

[54] VIBRATORY WELDING APPARATUS
[75] Inventor: Bruce L. Mims, Redding, Conn.
[73] Assignee: Branson Instruments, Incorporated, Stamford, Conn.
[22] Filed: Sept. 29, 1972
[21] Appl. No.: 293,366

[52] U.S. Cl. ............ 228/1, 29/205 CM, 29/470.1, 29/597, 156/73, 156/580
[51] Int. Cl. ............................................ B23k 1/06
[58] Field of Search .......... 228/1; 29/470.1, 205 E, 29/205 CM, 597; 156/73, 580

[56] References Cited
UNITED STATES PATENTS

| | | | |
|---|---|---|---|
| 2,659,959 | 11/1953 | Currivan | 29/205 C |
| 3,045,103 | 7/1962 | Warner | 29/597 |
| 3,156,037 | 11/1964 | Warner | 29/597 |
| 3,395,449 | 8/1968 | Moore | 29/597 X |
| 3,421,212 | 1/1969 | Chabot | 29/597 X |
| 3,730,817 | 5/1973 | Frohlich et al. | 228/1 X |

Primary Examiner—J. Spencer Overholser
Assistant Examiner—Robert J. Craig
Attorney, Agent, or Firm—Ervin B. Steinberg

[57] ABSTRACT

A vibratory welding apparatus for providing metal to metal welds at a plurality of circumferentially spaced locations of a workpiece, such as a motor armature, comprises a welding apparatus having a tip for engaging the workpiece. A nesting structure for the workpiece includes means for locating the workpiece relative to the tip, means for rotationally indexing in stepped fashion the workpiece on the nesting structure and alternatingly urging the workpiece into forced contact with the tip and then withdrawing it therefrom. Control means sequence the rotationally indexing and force engagement means as well as the vibratory welding apparatus. Energy control means are used to provide substantially equal amounts of energy per each weld.

3 Claims, 12 Drawing Figures

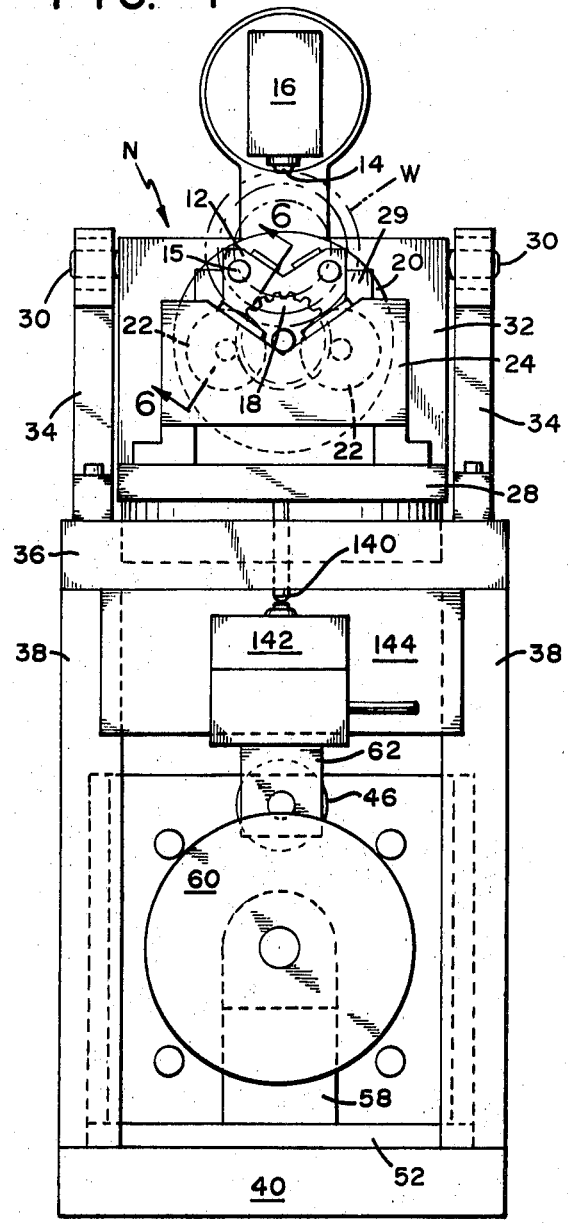
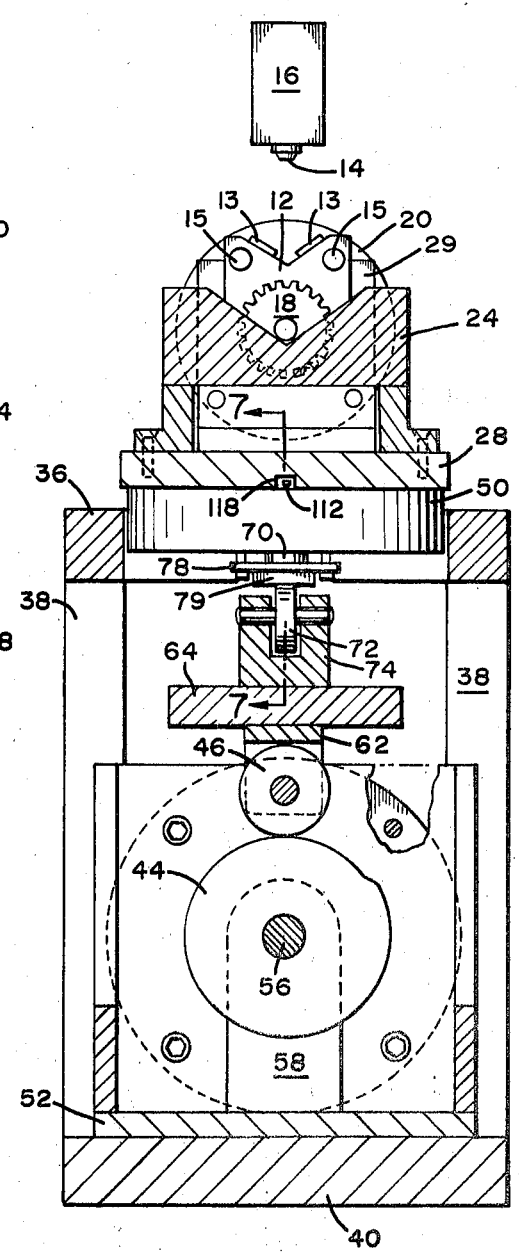
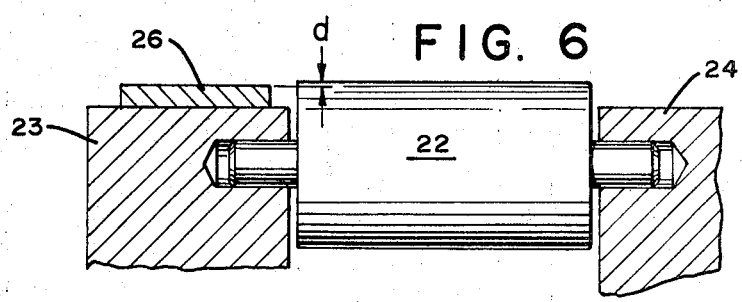

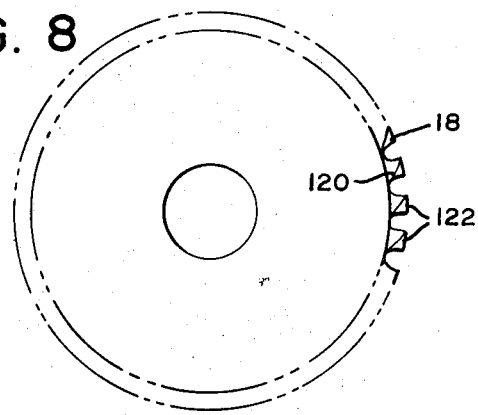
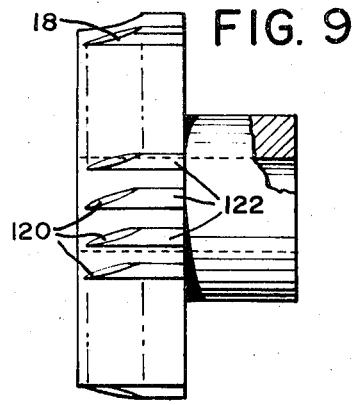
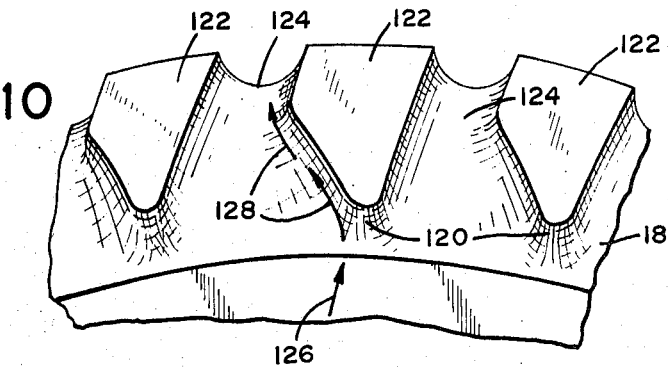
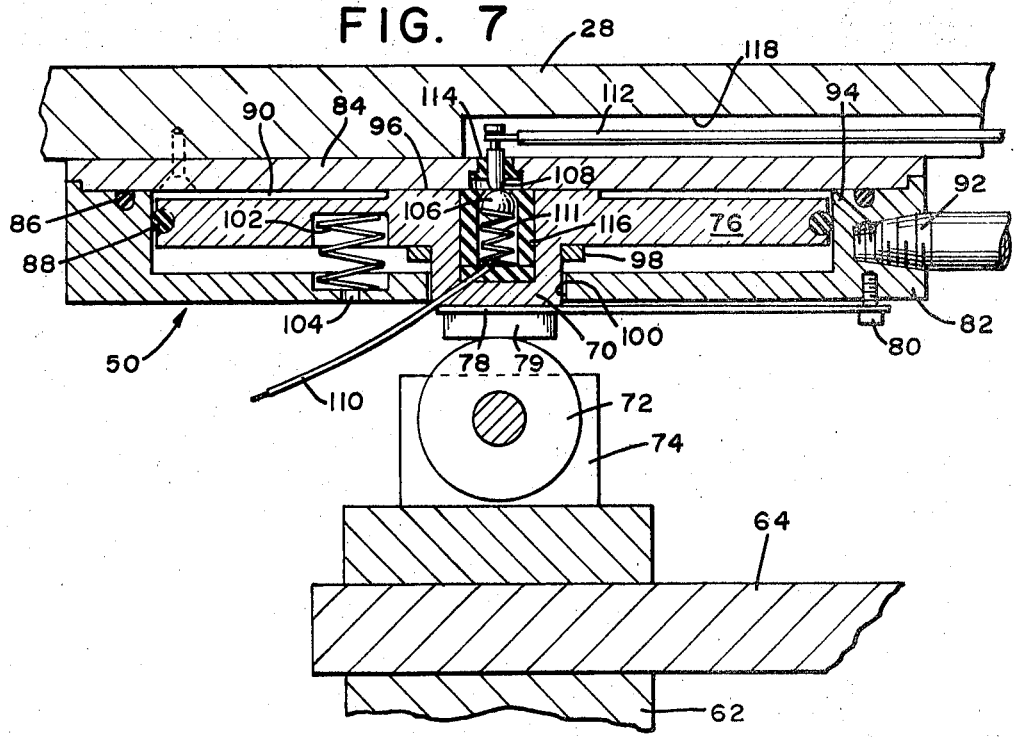

VIBRATORY WELDING APPARATUS

BACKGROUND OF THE INVENTION

This invention refers to an apparatus for welding together metal workpieces by means of vibratory energy. Method and apparatus for practicing such welding are disclosed in U.S. Pats. No. 2,946,119 and No. 2,946,120 dated July 26, 1960.

Vibratory welding comprises an arrangement for holding two metal workpieces to be joined in intimate contact under a static force and applying to one of the workpieces vibratory energy in a direction substantially perpendicular to the direction of the applied force. The result is a non-fusion metallurgical bond at the interface between the workpieces. The vibratory energy supplied generally is in the sonic or ultrasonic frequency range, and most commonly is in the range between 1 to 100 KHz.

The present invention concerns a vibratory welding apparatus specifically adapted to provide a weld at several circumferentially spaced locations of a workpiece, such as welding the electrical coil leads of a direct current motor armature to respective commutator segments.

In the past the coil leads have been joined to the commutator segments by solder. However, such a joint is not satisfactory for high temperature operation of the motor. It is known that under certain conditions the armature of an automobile starter motor can attain a temperature which is sufficiently high to soften the solder followed by a running of the molten solder. This condition, of course, leads to a failure of the starter motor. It has been found that this problem can be overcome by using the vibratory welding process for lead termination and thereby provide a metallurgical bond which is not subject to such a heat responsive failure.

Furthermore, the vibratory welding process is not only suitable for providing copper to copper joints, but also for producing copper to aluminum joints and aluminum to aluminum joints. This latter condition is particularly attractive in view of the ever increasing price of electrically conductive copper wire and the possibility of substituting high conductivity aluminum wire which is in ample supply for the heretofore used copper.

SUMMARY OF THE INVENTION

A typical armature for an automobile starter motor requires electrical circuit connections at 25 circumferentially spaced locations of the commutator. The instant invention discloses, more specfically, a nesting structure which includes means for supporting an article, such as a motor armature, relative to the workpiece engaging tip of a vibratory apparatus, means for cyclically bringing a respective weld location into contact with the work engaging tip of the vibratory apparatus, means for withdrawing the armature from engagement with the vibratory apparatus and means for angularly indexing the armature so that a next weld location is in position for contact with the tip of the vibratory apparatus. To this end, the nesting structure includes a support means reciprocatingly movable for causing engagement between the workpiece and the workpiece engaging tip of the vibratory welding apparatus under predetermined force conditions and includes, moreover, motive means coupled to the workpiece for rotationally indexing, in stepped fashion, the workpiece resting on the support means. Additionally, there are provided such control means as are necessary to suitably cycle the reciprocating motion of the support means and the rotational motion of the indexing means in predetermined sequence.

Other and still further features of the present invention will become more clearly apparent by reference to the following description when taken in conjunction with the accompanying drawing.

BRIEF DESCRIPTION OF THE DRAWING

FIG. 4 is a front elevational view of the apparatus;
FIG. 5 is a sectional view taken along line 5—5 of FIG. 2;
FIG. 6 is a sectional view taken along line 6—6 of FIG. 4;
FIG. 7 is a sectional view taken along line 7—7 of FIG. 5;
FIG. 8 is a front elevational view of the drive gear;
FIG. 9 is a side view of the gear of FIG. 8;
FIG. 10 is an enlarged portion of the gear showing the construction of the teeth.

DESCRIPTION OF THE PREFERRED EMBODIMENT

Figure 1:
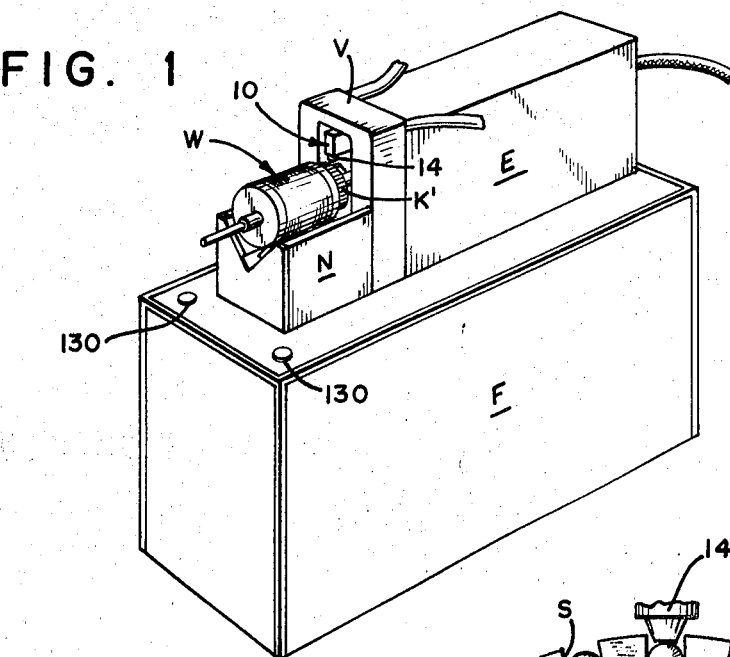
FIG. 1 is a perspective view of the apparatus.
Figure 1A:
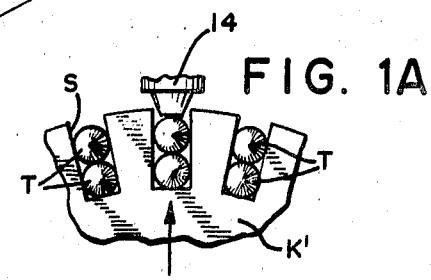
FIG. 1A is an elevational view of a segment of an armature.

Referring now to the drawing and FIGS. 1 and 1A in particular, there is shown a supporting frame F which supports an enclosure E containing a vibratory welding apparatus 10 of the type disclosed in the patents supra. Alternatively and preferably the enclosure may contain a vibratory welding apparatus of the type shown in FIGS. 9 or 11 of copending application for U.S. letters Pat. Ser. No. 234,189 filed Mar. 13, 1972 in the name of A. Shoh, entitled "Vibratory Welding Apparatus," which application is assigned to the assignee of this application. In cooperative engagement with the welding apparatus there is shown a nesting structure N which supports a workpiece W on which welds are to be performed. In the present example, the workpiece W is the armature of a direct current motor having a commutator K' comprising a plurality of segments, each segment including a slot S in which two superposed coil leads T, see FIG. 1A, are terminated. The nesting structure and the work engaging welding tip 14 of the vibratory apparatus 10 coact in such a manner that the coil leads T are welded to each other as well as to the commutator slots in order to provide a sound electrical connection. For making such a bond the workpiece engaging or welding tip 14 vibrates laterally at a high frequency, typically 10 KHz, while the elements to be welded are urged into forced engagement with the tip as is indicated by the vertical arrow in FIG. 1A. A typical commutator of this type has 25 locations at which welding is required. Therefore, the workpiece W is angularly indexed in increments of 14.4 degrees for sequentially accomplishing welding at adjacent locations. An exhaust system V surrounding the weld area exhausts metal dust created during the weld cycle. The detailed operation of the nesting structure will be more clearly apparent with reference to FIGS. 2 to 11.

Figure 2:
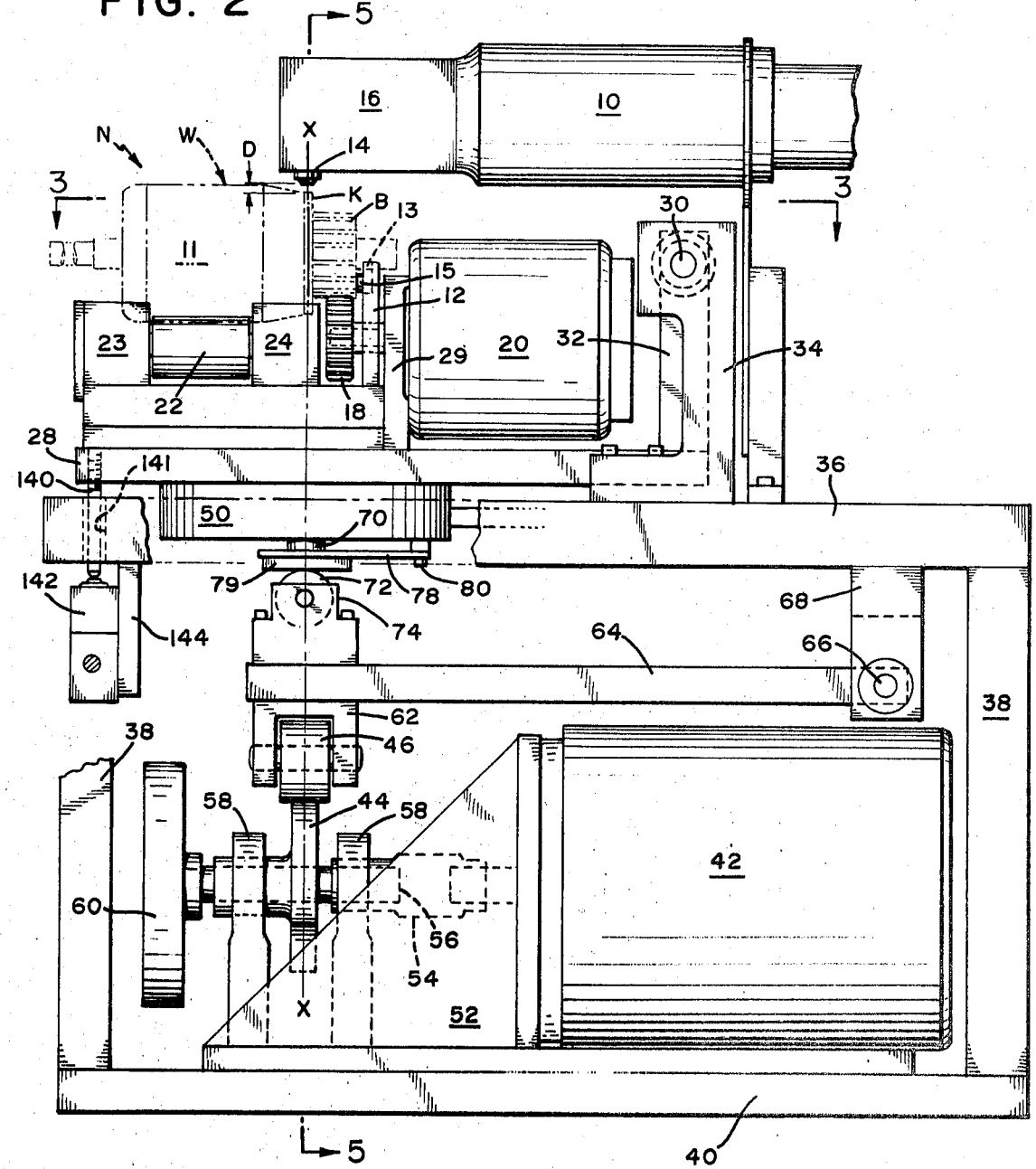
FIG. 2 is a side elevational view of the apparatus.

The nesting structure 10 is designed, as previously stated, to receive a workpiece W in the form of a motor armature having a plurality of coil leads terminating in superposed pairs in the commutator area K, FIG. 2, in substantially equally, angularly spaced relationship as seen in FIG. 1A. A V-shaped support block 12 with hardened inserts 13, FIG. 5, provides a nesting support for the armature shaft portion extending forward from the commutator, thus providing cooperative relation with the welding tip 14 which is attached to the horn 16, also known as resonator, of the vibratory welding apparatus 10. Hardened buttons 15 disposed in the front wall of the support block 12 serve as a stop for positioning the armature horizontally and thereby the coil leads or terminals of the armature winding beneath the work engaging welding tip 14. In order to more securely retain the armature in this horizontal position, permanent magnet means (not shown), spanning the gap between the buttons can be provided.

Figure 3:
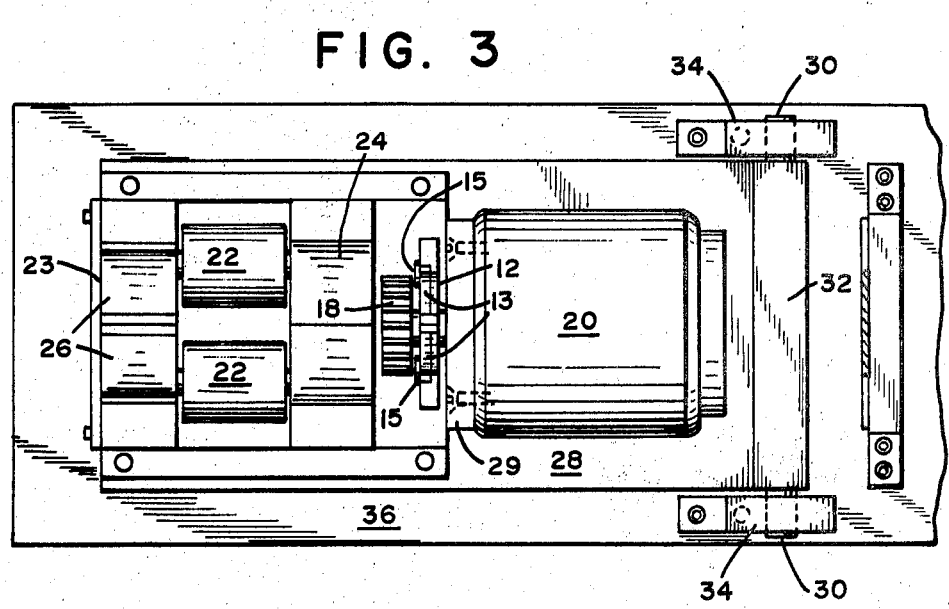
FIG. 3 is a plan view taken along line 3—3 of FIG. 2.

As each pair of superposed leads is welded, the armature is rotatably indexed to the next adjacent pair of leads. To accomplish this, a spur gear 18 engages serrations B, FIG. 2, which form a part of the commutator prior to it being machined to its final form. The gear 18 is driven by an electrically energized step motor 20. The body 11 of the armature is nested between two spaced idler rollers 22 journalled in two longitudinally spaced V-shaped blocks 23 and 24, thereby permitting the workpiece W to rotate when driven by the gear 18 responsive to electrical energy being applied to the step motor 20. A set of hardened face plates 26, Figs. 3 and 6, are used on the V-block 23 in front of the rollers 22 to prevent excessive wear on the V-block and the rollers. The plates 26 are positioned a small dimension d (FIG. 6) below the ridge line of the rollers 22 so as not to interfere with the rotation of the armature on the rollers 22.

A sub-plate 28, FIGS. 2, 3, 4 and 5, supports the V-blocks 23 and 24 and the support block 12. A vertical plate 29 extending from the sub-plate 28 serves for securing the motor 20. A vertical rib 32 also attached to the sub-plate 28 carries oppositely projecting pins 30, FIGS. 3 and 4, which are journalled in a pair of suitable bearings 34 for pivotally supporting the sub-plate 28. The pivotal axis through the center of the pins 30 is sufficiently spaced from the axis x—x through the center of the workpiece engaging welding tip 14 to cause the workpiece W to move from its withdrawn position to its lifted position for contact with the vertically stationary welding tip 14, distance D (FIG. 2), along a substantially vertical axis.

The bearings 34 stand upon the upper side of a horizontal plate 36 of a frame which includes vertical supports 38 extending upwardly from a stationary base plate 40. The desired predetermined engagement force between the workpiece W and the welding tip 14 is derived from a suitable motor 42 which drives via an eccentric cam 44 follower 46 for operating a pressure cell 50 which, in turn, through the heretofore stated sub-plate assembly moves first the armature W by the distance D and then provides and maintains the necessary engagement force against the tip 14.

The motor 42 is mounted upon a suitably shaped frame 52 secured to the stationary base plate 40 in such manner that the cam 44 is properly positioned for engaging the cam follower 46. A coupling 54 attached the motor shaft to the cam shaft 56 which is supported in a pair of spaced bearings 58 also secured to the frame 52. A flywheel 60 is mounted upon one end of the cam shaft 56 for preventing a sudden reversal of the cam 44 by the motor 42 during operation. The cam follower 46 is journalled in a bifurcated bearing 62 in a manner depending from a pivotally mounted arm 64. Substantially vertical motion of the cam follower 46, received from the cam 44, is obtained on account of the pivotal mounting of the arm 64 about pin 66 which is located in a bracket 68 depending from the horizontal plate 36. The substantially vertical motion of the cam follower 46 is transmitted to a piston rod 70, see FIG. 7, through a roller 72 which is journalled in a bearing block 74 attached to the opposite end of the arm 64. The piston rod 70 is constructed as an integral part of a pancake type piston 76. In order to prevent cocking of the piston 76 during the pressure stroke, a spring steel plate 78 having a hardened wear plate 79 is placed between the roller 72 and the piston rod 70 and secured to the pressure cell assembly 50 by a screws 80.

The pressure cell assembly 50 comprises a cylindrical housing 82, FIG. 7, with cover plate 84 which assembly is screw fastened to the sub-plate 28 for motion therewith. An O-ring seal 86 prevents escape of fluid, such as air, between the housing 82 and the cover plate 84, and a sealing ring 88 is disposed in a peripheral groove of the piston 76 to contain the fluid within the annular cavity 90 above the piston 76. The cavity 90 is pressurized, preferably with air under predetermined pressure, from a source of compressed fluid (not shown) through a fitting 92 and an inclined duct 94. A raised surface 96 on top of the piston 76 serves as an upper stop and a ring 98 serves as a lower stop. The piston rod 70 projects through an opening 100 in the bottom of the housing 82 for contacting the spring plate 78. A set of three circumferentially spaced springs 102 nested between the bottom of the housing 82 and the piston 76 urge the piston upwardly. An opening 104 vents ambient air from behind the piston as the piston undergoes reciprocating motion.

A pressure responsive switch comprises a spherical element 106 which is resiliently urged against an electrical contact 108 on the upward stroke of the piston 76. Closing of this switch causes an electrical circuit to be actuated for initiating the weld cycle through the conductor 110, spring 111, spherical element 106, contact 108 and lead wire 112. It should be noted that the contact 108 is mounted in the cover plate 84 and insulated therefrom by an insulating bushing 114. Similarly, the spherical element 106 and spring 111 are disposed in the recess of the piston 76 which is fitted with an insulating bushing 116. The upward motion of the spherical element is limited by a restriction in the insulating bushing. The conductor 110 is fed through the bottom edge of the piston rod with suitable insulation surrounding the conductor. The conductor 112 passes through a milled channel 118 in the sub-plate 28.

OPERATION OF NESTING STRUCTURE

For operation, the cavity 90 is pressurized with predetermined pressure, causing the piston 76 to move downward. An armature is inserted into the nesting structure by placing it upon the V-block 23 and sliding it longitudinally toward and onto the block 24 while simultaneously slightly lifting it so that the forward end of the shaft rests on the support block 12. Forward motion of the armature is stopped on contacting the inserts 13 and a permanent magnet serves to retain the armature in this position. At the same time the large diameter body portion of the armature rests on the rollers 22. Moreover, the serrations B of the armature are meshed with the gear 18, thus providing a rotationally indexed position of the armature. In order to preclude the possibility of one of the teeth of the serrations of the commutator jamming against the front edge of a gear tooth, the addendum of several teeth 122 of the gear 18 has been contoured as best seen at 120 in FIGS. 8, 9 and 10. As the armature serrations approach the gear 18 in the direction of the arrow 126, FIG. 10, the armature, if in a jamming position, is slightly rotated due to the teeth contour 120 and guided in a path represented by the arrows 128 toward the gear dedendum 124 to provide proper meshing.

For initiating the weld cycle two palm pushbuttons 130, FIG. 1, are operated. During the ensuing cycle motor 42 is operated with attendant rotation of cam 44 and cam follower 46 to cause pivotal motion of arm 64 about the axis of pin 66. In turn, roller 72 is urged into upward motion against the wear plate 79, forcing pressure plate 78 against the piston rod 70 and thus raising the piston 76 against the air pressure confined in the cavity 90. The sub-plate 28 is thereby raised in a pivoting manner about pins 30 and carrying the armature terminal area upwardly against the stationary work engaging welding tip 14, a distance D of approximately 1/8 inch. After contact between the upper wire T and the welding tip, the force between the two increases until it reaches the preset force in the cylinder. Then the piston 76 deflects upward against the air pressure in the cavity 90 until the spherical element 106 engages the contact 108, thereby completing the circuit for energizing the vibratory welding 10 and effecting a weld between the wires T and the surfaces forming the slot S. At the same time, the alternating current is removed from the motor 42 and a direct current source is applied to the motor 42 to effect a braking action on the motor to stop rotation of the cam 44 and the resultant upward motion of the force exerting mechanism. The flywheel 60 prevents the sudden reversal of the cam at the instant the alternating current is removed from the motor 42. The engagement force, typically 500 to 1,000 pounds per square inch, remains substantially constant during the welding cycle despite a substantial deformation of the wires since the pancake shaped piston with gas cushion acts substantially as a constant force spring.

At the end of the weld cycle the direct current applied to the motor 42 is removed and alternating current substituted with a reversal of motor rotation so as to return the cam to its starting point. This action lowers the piston 76. An actuating pin 140 (FIGS. 2 and 4) mounted in sub-plate 28 and extending through a clearance hole 141 in the plate 36 actuates a sensing switch 142 mounted on a depending plate 144 which is fastened to the plate 36. This switch, upon being actuated by the descending sub-plate 28, initiates the indexing cycle by energizing the step motor 20 for indexing the armature to the next weld location. When indexing is completed, motor 42 is energized once again to establish engagement between the armature and the welding tip. This cycle is repeated until all connections to be made along the commutator periphery have been welded.

DESCRIPTION OF SCHEMATIC CIRCUIT DIAGRAM

Figure 11:
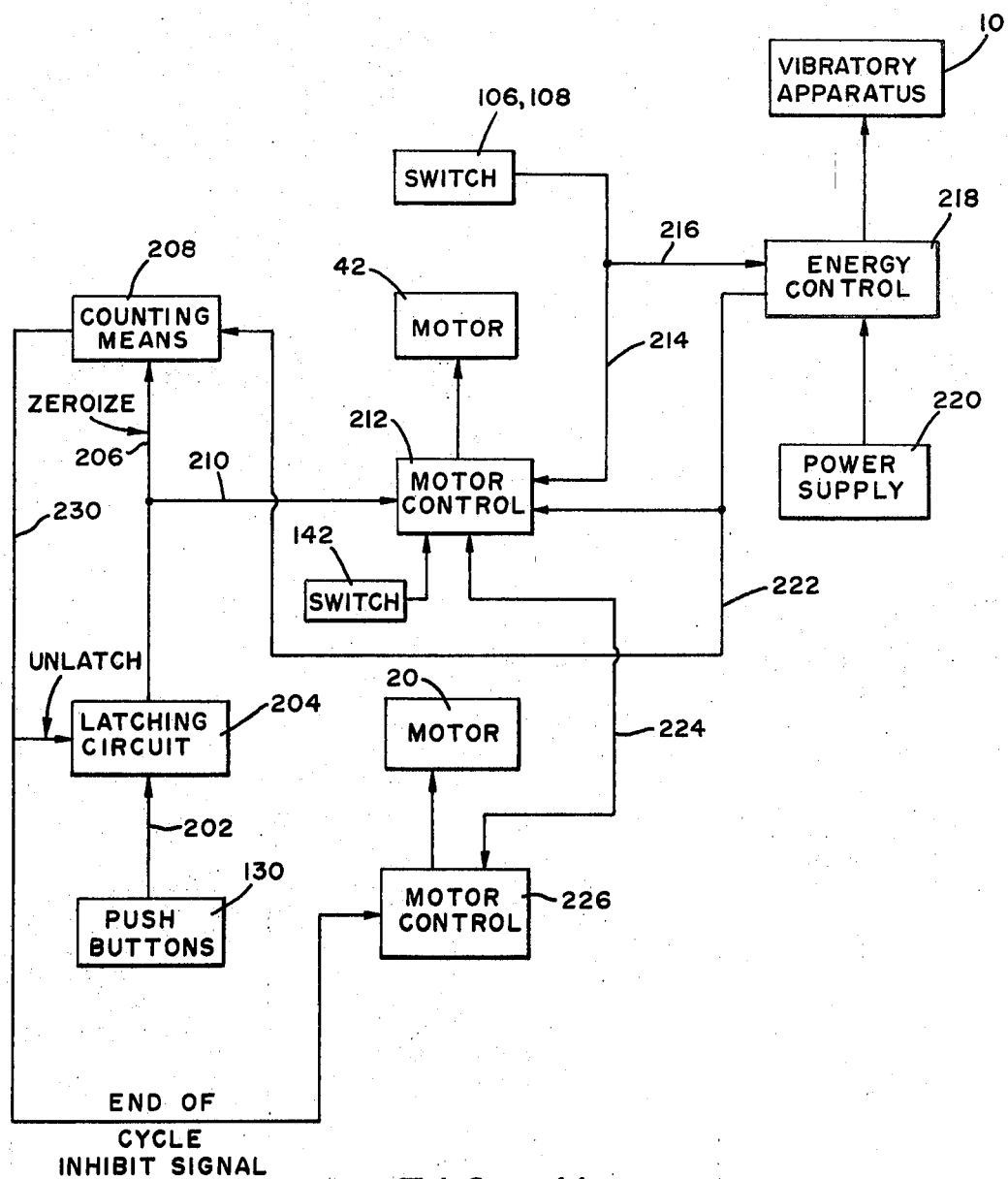
FIG. 11 is a schematic block diagram of the control circuit.

FIG. 11 is a schematic diagram of the control circuit for operating the vibratory welding apparatus. Upon actuating the pushbuttons 130 a signal is provided via line 202 to a latching circuit 204 which via conductor 206 provides a zeroizing signal to a counter circuit 208, and a signal via conductor 210 to a motor control circuit 212. The motor control circuit 212 energizes the motor 42, thus causing rotation of the eccentric cam 44 and lifting of the workpiece against the welding tip 14. As the workpiece assumes its forced engagement with the welding tip, an electrical circuit is established between the spherical element 106 and the pin 108, acting as a switch, and a signal is sent via conductor 214 to the motor control circuit 212 which removes the alternating current from the motor 42 and applies braking direct current to the motor 42 for instantaneously stopping the rotation thereof. Also, a signal is sent via the conductor 216 to an energy control circuit 218 which actuates the power supply 220 and controls the amount of energy provided by the power supply 220 to the vibratory welding apparatus 10. The purpose of the energy control circuit 218 is to provide uniform amounts of acoustic energy into each weld and produce a signal if the weld time exceeds a predetermined value which would indicate that the power to the weld was abnormally low and the quality of the weld therefore suspect. A typical energy control circuit suitable for this purpose is disclosed in U.S. Pat. No. 3,162,747 dated Dec. 22, 1964, H. Netzsch. The power supply 220, most suitably, is constructed as shown in U.S. Pat. No. 3,432,691 dated Mar. 11, 1969, A. Shoh, entitled "Oscillatory Circuit for Electro-Acoustic Converter."

At the termination of the weld cycle the energy control apparatus 218 provides a signal via conductor 222 to the motor control circuit 212 for removing the direct current and reversing the direction of rotation of the motor 42 in order to withdraw the workpiece from the welding tip 14. Also, the conductor 222 applies a signal to the counter 208 for stepping the counter circuit. When the motor 42 lowers the movable plate 28 to a predetermined position as sensed by the switch 142 (FIG. 2) a signal is provided to the motor control circuit for stopping the motor 42 and a further signal is provided via conductor 224 to a motor control circuit 226 which operates the step motor 20 for indexing the workpiece to its next weld location. When the motor 20 has indexed the workpiece by the predetermined angular displacement, the control 226 provides a signal via conductor 224 to the motor control 212 for operating the motor 42 and repeating the operating cycle just described.

When the counter circuit 208 receives via conductor 222 a signal which adjusts the counter circuit 208 to its predetermined final count, such as the 25th weld having been completed, a signal is provided along conductor 230 for causing unlatching of the latching circuit 204 for providing an inhibit signal to the motor control circuit 226 in order to prevent further indexing of the workpiece. Upon removal of the welded workpiece and placing a new workpiece in the nesting structure, a new cycle of operation is started responsive to the operation of the pushbuttons 130 and the above described procedure is repeated.

While the above description indicates that adjacent weld locations are indexed in sequence, it will be obvious to those skilled in the art that welding may be performed by skipping a certain number of consecutive locations, thus using larger increments and completing one welded assembly in the course of several rotations.

What is claimed is:

1. A vibratory welding apparatus comprising:
   a source of vibratory energy having a workpiece engaging tip;
   a nesting structure adapted to receive a workpiece and support it to cause a location to be welded to be in correlated position relative to said tip;
   movable means coupled to said nesting structure for causing said workpiece to undergo reciprocating motion to provide alternatingly forced engagement between said tip and workpiece and causing the workpiece to be withdrawn from said tip;
   further means coupled to said nesting structure for rotationally indexing the workpiece supported on said structure in stepped fashion to expose sequentially different circumferentially spaced locations of the workpiece to said tip;
   control means coupled to said source of vibratory energy, said movable means and to said further means for causing the workpiece to undergo said reciprocating motion, for rotationally indexing the workpiece when the workpiece is withdrawn from said tip and for actuating said source when said tip is in forced engagement with the workpiece, and
   said control means including an energy control means for operating said source in a manner to provide substantially equal amounts of vibratory energy during each actuation of said source, and including also a counting means for inhibiting operation of said movable means and of said further means when a predetermined quantity of said circumferentially spaced locations have been exposed to vibratory energy from said tip.

2. A vibratory welding apparatus as set forth in claim 1, said movable means comprising a motor adapted to rotate a cam means which exerts when rotated a force upon a gas filled pressure cell forming a part of said nesting structure, said pressure cell responsive to the force exerted by said cam means causing the workpiece to be in engagement with said tip.

3. A vibratory welding apparatus as set forth in claim 2, said motor being further adapted to undergo bidirectional motion, and sensing means coupled for stopping rotation of said motor and cam means when a predetermined engagement pressure between said tip and workpiece is attained.

* * * * *

PO-1050
(5/69)

UNITED STATES PATENT OFFICE
CERTIFICATE OF CORRECTION

Patent No. 3,791,569      Dated Feb. 12, 1974

Inventor(s) Bruce L. Mims

It is certified that error appears in the above-identified patent and that said Letters Patent are hereby corrected as shown below:

Column 2, line 42, "No. 234,189" should read --No. 234,198--.

Signed and sealed this 29th day of October 1974.

(SEAL)
Attest:

McCOY M. GIBSON JR.
Attesting Officer

C. MARSHALL DANN
Commissioner of Patents